(12) United States Patent
Ingistov

(10) Patent No.: US 6,622,490 B2
(45) Date of Patent: Sep. 23, 2003

(54) TURBINE POWER PLANT HAVING AN AXIALLY LOADED FLOATING BRUSH SEAL

(75) Inventor: Steve Ingistov, Los Angeles, CA (US)

(73) Assignee: Watson Cogeneration Company, Carson, CA (US)

(*) Notice: Subject to any disclaimer, the term of this patent is extended or adjusted under 35 U.S.C. 154(b) by 78 days.

(21) Appl. No.: 10/044,032

(22) Filed: Jan. 11, 2002

(65) Prior Publication Data

US 2003/0131602 A1 Jul. 17, 2003

(51) Int. Cl.[7] ................................................. F02C 6/08
(52) U.S. Cl. .................... 60/782; 415/174.2; 415/174.3; 415/174.5; 415/173.3; 415/173.5; 277/355
(58) Field of Search ................ 60/782, 785; 415/174.2, 415/174.3, 173.3, 173.5, 174.5, 230, 231, 180, 1; 277/355, 53

(56) References Cited

U.S. PATENT DOCUMENTS 5,181,728 A * 1/1993 Stec ............................ 277/355
5,480,162 A * 1/1996 Beeman, Jr. ................. 277/355
5,630,590 A   5/1997 Bouchard et al. ............. 277/53
5,961,279 A  10/1999 Ingistov .................... 415/170.1
5,997,004 A * 12/1999 Braun et al. ................. 277/352
6,170,831 B1 * 1/2001 Bouchard .................... 277/355
6,220,814 B1 * 4/2001 Brushwood et al. .......... 415/47
6,382,632 B1 * 5/2002 Chupp et al. ............... 277/355

OTHER PUBLICATIONS

"Brush Seals", *Directions*, Sep. 1993.

* cited by examiner

*Primary Examiner*—Charles G. Freay
*Assistant Examiner*—William H. Rodriguez
(74) *Attorney, Agent, or Firm*—Patrick J. Kim; F. Lindsey Scott

(57) ABSTRACT

An axially loaded floating brush seal useful in a stationary gas turbine engine having a first rotary compressor component having a rotor having a radial surface, a second non-rotary component having an end ending near the radial surface with the floating brush seal being positioned between the first and the second components to substantially reduce the flow of air between the first and second components. A method for controlling the flow of cooling air into a chamber in the second component using the rotary brush seal is also disclosed.

20 Claims, 5 Drawing Sheets

TURBINE POWER PLANT HAVING AN AXIALLY LOADED FLOATING BRUSH SEAL

BACKGROUND OF THE INVENTION

1. Field of the Invention

The present invention relates to large, stationary turbine power plants and more particularly to an axially loaded floating brush seal useful in large, stationary turbine power generators of the type used for utility services.

2. Description of the Prior Art

A typical stationary turbine power plant, known as Model Series 7001 simple cycle, single shaft, heavy-duty gas turbine (Frame-7 machine), is available from General Electric of Schenectady, N.Y. In this and similar gas turbines, a seal is located between an axial compressor rotor and a stationary inner barrel member, a chamber within the inner barrel member being supplied with cooling air from the last stage of the compressor by a controlled amount of leakage through the seal. A set of shaft bearings is located in the chamber.

Leakage in excess of a predetermined amount required for cooling of the bearings becomes parasitic and contributes to inefficiency of the turbine power plant. This is a serious problem in turbine power plants of the prior art, in that the labyrinth seals, which are positioned to limit the air leakage, degrade in operation because of thermal expansion and other factors that cause knife-edge labyrinth seal members and adjacent rotating elements of the seals to be worn away quickly, particularly during start-up and shut-down sequences. This is caused, for example, by thermal expansion and shrinkage of the inner barrel member being more rapid than the thermal expansion and shrinkage of the rotor at the seal. Thus, in the frame-7 machines, the bypass airflow may increase to approximately 100,000 lb/hr or higher from the 30,000 lb/hr that is considered optimal. Consequently, there is a loss of power that is believed to be between 1.5 MW (megawatts) and 3.0 MW.

Brush seals for aircraft gas-turbine engines are known, being disclosed, for example in "Brush Seals", Directions, September 1993. As disclosed therein, a brush seal consists of densely packed metallic bristles that are welded between a down-stream backing plate and an up-stream side plate. In a typical round seal for aircraft turbine applications, the plates are ring-shaped, the bristles extending radially inwardly at a trailing lay angle and making an interference contact with a rotor element, so that the bristles become curved and follow the rotor as it grows and shrinks during engine operation.

Brush seals have not been applied to existing large power plant turbines for a number of reasons. For example, the existing rotor components, being made from elements of low carbon steel alloys that are selected for certain thermal expansion properties, are believed to be unsuitable as wear surfaces for contact by the bristles, particularly during the extended operation cycles that are demanded of stationary power plants. Suitable hardening of applicable compressor rotor members is believed to be prohibitively expensive, particularly in existing equipment.

In U.S. Pat. No. 5,630,590, issued May 20, 1997 to Joseph P. Bouchard and Merrell W. Long entitled "Method and Apparatus for Improving the Air Sealing Effectiveness in a Turbine Engine", a brush seal is disclosed for use in a gas turbine engine. This patent is hereby incorporated in its entirety by reference.

In U.S. Pat. No. 5,961,279, issued Oct. 5, 1999 to Steve Ingistov entitled "Turbine Power Plant Having Minimal-Contact Brush Seal Augmented Labyrinth Seal", a brush seal is disclosed for use in a gas turbine engine. This patent is hereby incorporated in its entirety by reference.

Both of these patents disclose fixed brush seals which are positioned on an end of the inner barrel with suitable spacing from the compressor rotor so that they do not engage existing rotor components. If engagement of the brush seal and the rotor components occurs, the engagement is a result of wobbling of the power shaft connecting the turbine and the compressor, differential expansion of the compressor components and the inner barrel of the machine and the like. As a result, the contact can result in a very high-pressure contact of the brush bristles with the existing rotor components since the bristles are fixed relative to the inner barrel. Accordingly, when contact occurs it can be very forcible, with resulting damage to the rotor components. As a result, clearance space must be provided to attempt to accommodate the worst-case situation. Accordingly, considerable air bypasses the bristles and as a result the use of a labyrinth seal in connection with the bristles is disclosed.

The use of a labyrinth seal in itself entails substantial difficulties with respect to start-up and shutdown operations. These shortcomings are discussed at considerable length in both of the patents discussed above.

Since it is desirable, for the reasons discussed above, to control the amount of air passing between the rotor components and the chamber inside the inner barrel, improved sealing methods have been sought.

SUMMARY OF THE INVENTION

The invention comprises a stationary gas turbine engine for a power plant having an axially loaded floating brush seal and comprising:

a) a multistage axial compressor, the compressor having a rotor, the rotor having a radial surface downstream of at least a major portion of the compressor:

b) a turbine shaft-coupled to the rotor;

c) a stationary inner barrel member having an end and a cavity positioned in the end of the inner barrel member, the cavity having an inner surface, the inner barrel being downstream of at least a major portion of the compressor, air flowing from the compressor passing outside of the inner barrel member, a chamber within the inner barrel member forming a passage for cooling air from the compressor, the cooling air flowing from the chamber and being mixed with combustion gases upstream of the turbine;

d) an axially loaded floating brush seal for controlling air passage into the chamber from the compressor, the axially loaded floating brush seal comprising:

(i) a bristle holder axially positioned relative to the inner barrel;

(ii) a multiplicity of bristle members extending axially from the bristle holder toward the radial surface of the rotor, downstream bristle member ends being rigidly retained relative to the bristle holder;

(iii) a back plate connected to a downstream end of the bristle holder and having its downstream side adapted to engage a spring; and, (iv) at least one spring mounted between the back plate and an inner surface of the cavity to urge the bristle members into contact with the radial surface of the rotor.

The present invention further comprises a stationary gas turbine comprising:
(a) a first rotary compressor component having a rotor having a radial surface;
(b) a non-rotary second component having an end extending over and around at least a portion of the rotor with an end near the radial surface and including a cavity;
(c) a passageway between the end of the second component and the rotor; and,
(d) an axially loaded floating brush seal positioned on the end of the second component to resiliently engage the radial surface, the floating brush seal comprising:
  (i) a bristle holder axially positioned relative to the second component;
  (ii) a multiplicity of bristle members extending axially at their first ends from the bristle holder toward the radial surface of the rotor, second ends of the bristle members being rigidly retained relative to the bristle holder;
  (iii) a back plate connected to a downstream end of the bristle holder; and,
  (iv) at least one spring mounted between the back plate and an inner surface of the cavity to urge the bristle members into contact with the radial surface of the rotor.

The present invention further comprises a method for controlling cooling air flow into a chamber in a stationary inner barrel member in a turbine power plant having a multi-stage axial compressor, a turbine shaft-coupled to a rotor of the compressor, the rotor having a radial surface positioned circumferentially relative to the shaft and near an end of the stationary inner barrel member, the method consisting essentially of:
(a) positioning a brush seal comprising:
  (i) a bristle holder axially positioned relative to the inner barrel;
  (ii) a multiplicity of bristle members extending axially at their first ends from the holder toward the radial surface of the rotor, second ends of the bristle members being rigidly retained relative to the bristle holder;
  (iii) a back plate connected to an end of the bristle holder; and,
  (iv) at least one spring mounted between the back plate and an inner surface of a cavity in the end of the inner barrel to urge the bristle members into contact with the radial surface of the rotor; and,
(b) providing substantially all of the cooling airflow required in the chamber via at least one flow-controlled passageway in fluid communication with at least one of a compressor outlet and an auxiliary air source and the chamber.

DESCRIPTION OF THE PREFERRED EMBODIMENTS

In the discussion of the FIGS. the same numbers will be used throughout to refer to the same or similar components.

Figure 1:
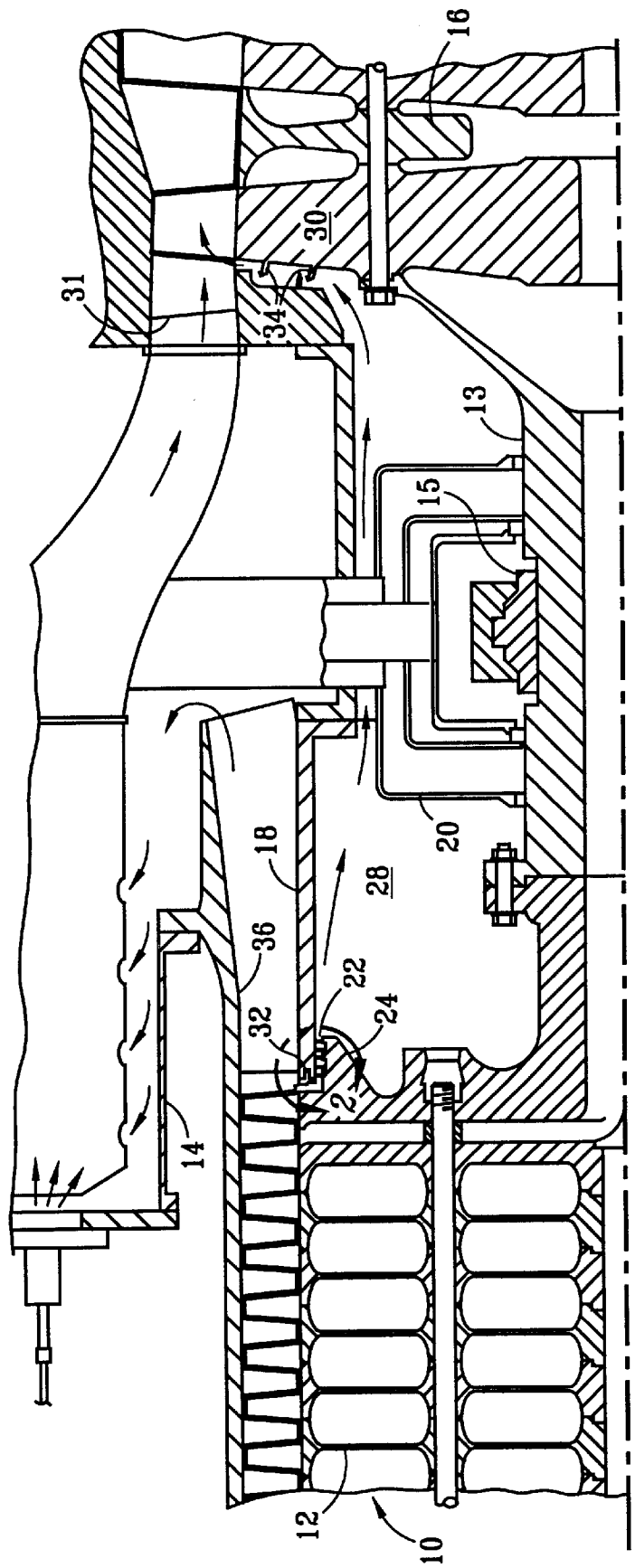
FIG. 1 is a fragmentary sectional elevational view of a prior art stationary turbine power plant machine.
Figure 2:
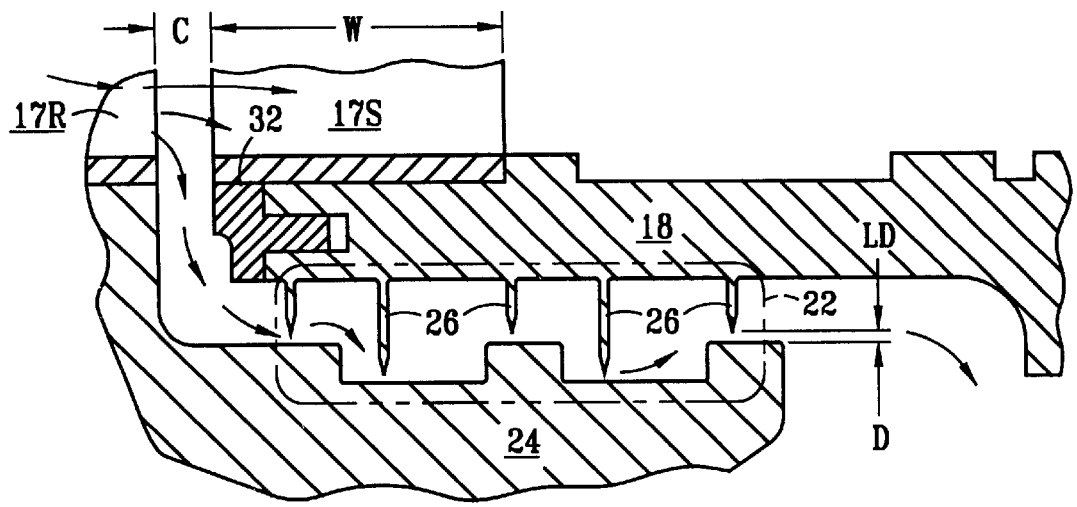
FIG. 2 is a detailed sectional view of the prior art machine of FIG. 1 within region 2 thereof.

A prior art gas turbine machine 10 as disclosed in FIGS. 1–2 has a multi-stage axial compressor 12, a combustor 14, and a turbine 16 that is shaft-coupled to compressor 12 by a shaft 13 at least partially positioned within an inner barrel member 18, a set of shaft bearings 15 being mounted within a bearing housing 20 located within barrel member 18. Compressor 12 has a last or seventeenth stage 17R on a rotor member 24, and an associated stator 17S supportively positioned on inner barrel member 18. A labyrinth seal 22 is located between rotor member 24 and the inner barrel member 18, labyrinth seal 22 including a plurality of stationary knife-edge members 26 projecting inwardly from barrel member 18 toward a series of radially offset cylindrical portions of rotor member 24. A small annular clearance normally exists between each knife-edge member 26 and rotor member 24 as indicated by a radial gap distance LD, the distance LD being made approximately 0.030 inch at manufacture. A chamber 28 is formed within barrel member 18, and is supplied with cooling air from the last stage of compressor 12 by a controlled amount of leakage through labyrinth seal 22. The cooling air, after passing rotor bearing housing 20, flows outwardly in front of a first wheel 30 of turbine 16 and mixes with high-temperature gases passing from combustor 14 through a nozzle block 31. Barrel member 18 can be segmented, being maintained in alignment as known to those skilled in the art, at least partially by an interlocking insert ring 32 that also supports final stator member 17S of compressor 12. Typically, inner barrel member 18 is formed by a pair of semi-circular segments, insert ring 32 being formed in three segments that overlap joints between the segments of the barrel member. Insert ring 32 is axially spaced from a portion of rotor member 24 by a distance C through which the cooling air flows toward labyrinth seal 22, distance C corresponding to a space between rotor 17R and stator 17S, stator 17S also having a width W. Machine 10 under design conditions produces air flow at a pressure of approximately 167 psi gage and a temperature of approximately 675° F. at the exit of compressor 12, the main portion of the flow being between inner barrel member 18 and an outer barrel member 36 that surrounds inner barrel member 18. A radially spaced pair of "angel wings" 34 project forwardly toward compressor 12 from first wheel 30 for controlling cooling air flow from chamber 28 to turbine 16. Chamber 28 within inner barrel member 18 is intended to be maintained at a pressure of approximately 82 psi gage by the flow of cooling air through labyrinth seal 22.

Turbine machine 10, being of the type that is commercially available as Series 7001 heavy duty gas turbine from the previously identified General Electric Corp., has a somewhat protracted start-up sequence that lasts over one hour and a shut-down sequence that lasts approximately one hour as disclosed in U.S. Pat. No. 5,961,279. Typically, there is significant wear of knife edge members 26 against rotor member 24 during portions of the shut-down sequence from the as-manufactured condition, the distance LD rapidly increasing to between approximately 0.070 inch and approximately 0.110 inch. This increased clearance adversely affects performance of machine 10 by lowering the flow of pressurized air into combustor 14 as well as excessively lowering the turbine inlet temperature (by mixing the low temperature stream of compressed cooling air with the stream of hot combustion gases from combustor 14).

Figure 4:
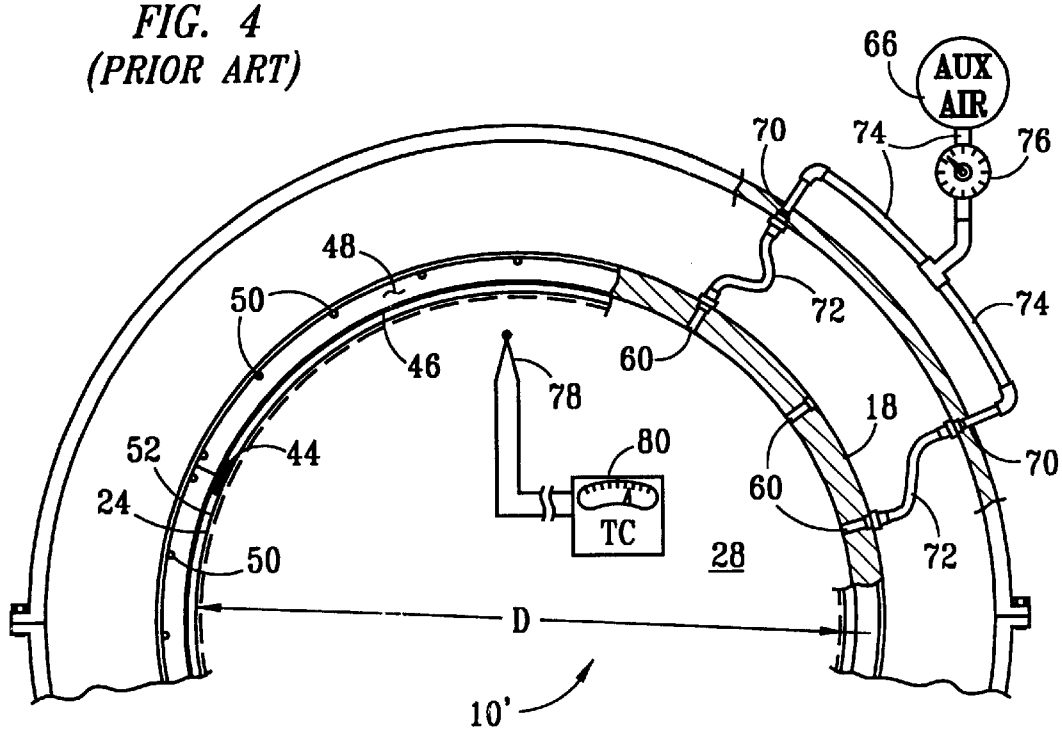
FIG. 4 is a cross-sectional view of the machine shown in FIG. 1 showing a prior art system for supplying air to a chamber in an inner barrel.
Figure 3:
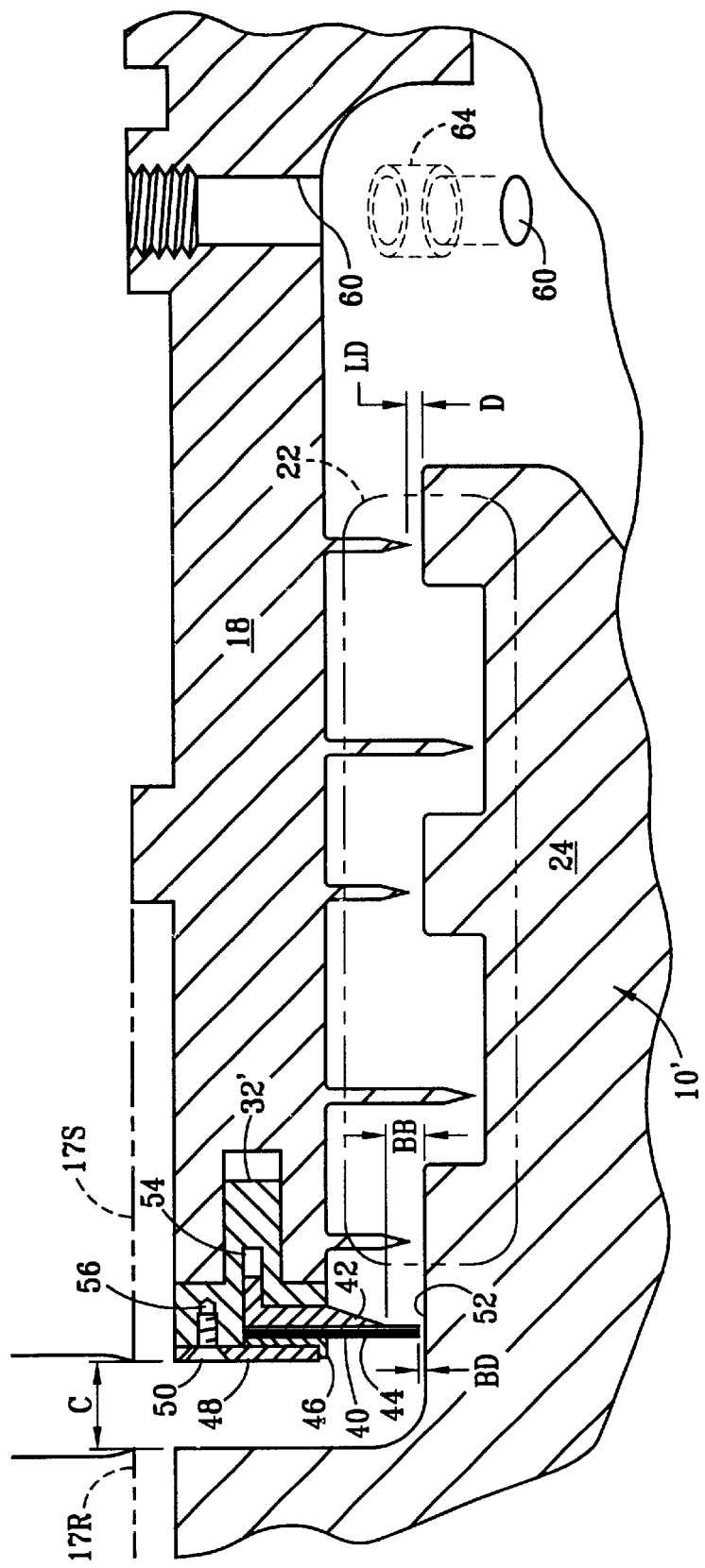
FIG. 3 is a sectional view of the prior art machine of FIG. 1 within region 2 thereof including a prior art brush seal.

As shown in FIGS. 3 and 4, the machine, designated 10', is provided with a brush seal 40 for augmenting labyrinth seal 22. Brush seal 40 includes a backing plate 42, a multiplicity of tightly packed bristle members 44, and a cover plate 46. Bristle members 44 are clamped between backing plate 42 and cover plate 46, outer extremities of the bristle members being positively anchored to plates 42 and 46 by welding or other suitable means. Bristle members 44 are typically very thin, being formed of a high-strength metal alloy, and closely packed. A representative bristle density is a density of approximately 4,500 bristles in an area defined by a one inch diameter circle.

In an exemplary configuration of machine 10', a retainer plate 48 holds the brush seal 40 in fixed relation to barrel member 18 by interlocking engagement with a counterpart of the insert ring, designated adapter ring 32', backing plate 42 having a generally L-shaped cross-section, one leg of which axially projects into adapter ring 32'. Retainer plate 48 is fastened to insert ring 32' by a plurality of threaded fasteners 50. In the exemplary configuration of FIG. 3, fasteners 50 are conventional undercut flat head machine screws having a thread diameter of approximately 0.99 inch, being spaced circumferentially not more than 6 inches on center, and staked in place. As further shown in FIG. 3, bristle members 44 are located in spaced relation to a land region 52 of rotor member 24, the land region having a diameter D, bristle members 44 being radially spaced at a distance BD from land region 52. Thus brush seal 40 is fluid-connected in series with the labyrinth seal in a "cold" condition of machine 10' and distance BD is preferably approximately 0.010 inch for preventing unwanted contact between bristle members 44 and rotor member 24. It is contemplated that momentary contact between bristle members 44 and rotor member 24 may occur during the shut-down sequence as explained above, but that no such contact with occur either during the initial portion of the start-up sequence or during steady-state full load operation of machine 10'. It is believed that the preferred avoidance of continuous brush contact is attained when the "cold" clearance (with rotor member 18 stationary) is not less than 0.015 percent of the diameter D. In the case of the "Frame-7 machine", diameter D is approximately 50.5 inches; accordingly, distance BD is preferably not less than 0.00757 inch, being more preferably approximately 0.010 inch. In the "cold" condition, backing plate 42 is radially spaced at a distance BB from rotor member 24, distance BB being sufficiently great for preventing contact with the rotor member, yet sufficiently small for supporting bristle members 44 against upstream air pressure. In the above example, a preferred value for distance BB is approximately 0.170 inch. Backing plate 42 is also tapered inwardly and forwardly for fail-safe limitation of rotor contact in the event of abnormal operating conditions. Under design conditions, clearance distance BD is contemplated to be somewhat less than in the cold condition in which machine 10' is characterized, but not so much less as to create contact. If testing shows otherwise, clearance distance BD is preferably to be made slightly larger.

It has been contemplated that brush seal 40 can be added to existing turbine machines 10 having worn labyrinth seals 22 as described above by modification of insert ring 32. Particularly, adapter ring 32' can be formed by axially shortening existing insert ring 32, forming an annular channel as indicated at 54, and forming threaded openings 56 for fasteners 50. Adapter ring 32' can be segmented as described above in connection with insert ring 32.

It has also been contemplated that brush seal 40 be used in "fresh" installations having no wear of labyrinth seal 22. In such cases, the labyrinth seal radial spacing LD, which is only 0.03 inch, quickly increases as a result of wear during shut-down as described above. Nevertheless, it may be desired to augment the flow of cooling air into chamber 28. Accordingly, and as shown in FIG. 3, barrel member 18 is preferably provided with one or more threaded passages 60. Selected ones of passages 60 may be closed or partially blocked by plugs 62, jets 64, valves 76 or the like.

Also, some or all of passages 60 can be fluid-connected to an auxiliary source 66 of pressure air as shown in FIG. 4. More particularly, outer barrel member 36 of turbine machine 10 is provided with one or more fluid ports 70, an inner conduit 72 being fluid-connected between each port 70 and a corresponding one of threaded passages 60, an outer conduit 74 being fluid-connected between port(s) 70 and the auxiliary source 66 and having adjustable valve 76 series-connected therein for adjustably restricting the flow of auxiliary cooling air into chamber 28 of the inner barrel member. Preferably valve 76 is a calibrated needle valve for facilitating repeatable adjustment thereof in response to a monitored operating parameter of machine 10. The monitored operating parameter can be an inside temperature of inner barrel member 18, which grows to exceed a preferred value if brush seal 40 is excessively effective in restricting the flow of cooling air from compressor 12 into chamber 28. FIG. 4 shows a thermocouple temperature sensor 78 that is normally provided with machine 10 of FIGS. 1–2, sensor 78 having a conventional indicator 80 associated therewith. Manual control of needle valve 76 in response to readings of the indicator is appropriate in that the start-up sequence of the machine is sufficiently slow. Auxiliary source 66 must be maintained at greater pressure than that of chamber 28 for assuring the proper direction of flow. It will be understood that at least a portion of auxiliary source 66 can be provided by compressor 12. Indeed, when any of passages 60 are left open or provided with jets 64, but not the inner and outer conduits 72 and 74, that portion of auxiliary source 66 is the last stage of compressor 12. Also, it may be preferred to take from an earlier stage of compressor 12, or from an independent source, to provide auxiliary source 66 for reasons of greater efficiency and/or reduced cost.

It is disclosed that machine 10 will provide approximately 1.5 megawatts of additional power output from a typical installation of the Frame-7 machine, resulting in a savings on the order of $250,000 per machine, the installation cost being on the order of $30,000.

Figure 5:
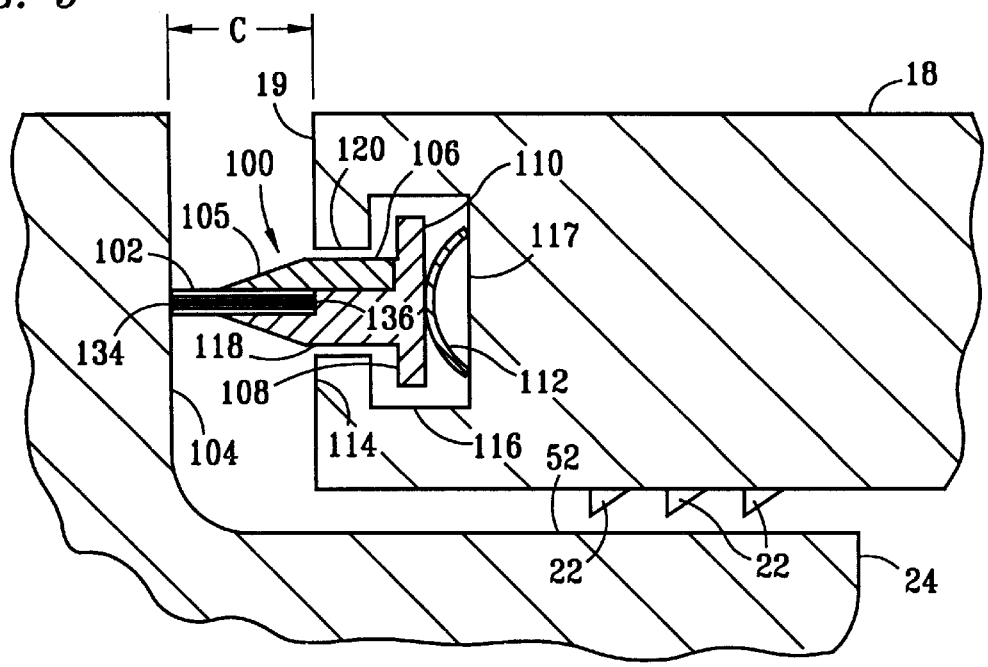
FIG. 5 is a sectional view of an axially loaded floating seal positioned in an end of the inner barrel according to the present invention.

In FIG. 5 an end portion 19 of inner barrel 18 is shown. A cavity 116 is positioned in first end 19 of inner barrel 18. The cavity is formed with a circumferential lip 114 around the outer end of the cavity nearest a radial surface 104 of rotor member 24. The cavity is configured to accept a mating backing plate 108. When the compressor discharge air attains a full pressure level it will create a pressure differential across backing plate 108. A properly sized backing plate 108 will impose the required axial load on brushes 102. Radial surface 104 is formed on axial compressor rotor 24. A labyrinth seal 22 is typically positioned between inner barrel 18 and rotor member 24 at a land area 52. The labyrinth seal as discussed in conjunction with the embodiments disclosed above may be used with the seal or may be omitted with the seal of the present invention. The axially loaded seal 100 of the present invention comprises bristles 102 having a first end 134 and a second end 136 positioned in a bristle holder 105 comprising backing plate 108 and a clamping plate 106. The bristles may be retained in bristle holder 105 by other means as known to those skilled in the art. The bristles are as described above. i.e. these bristles are typically very thin and are formed of a high tensile strength metal alloy and closely packed at a high density such as approximately 4500 in a one inch diameter circle. Considerable variation is possible in the fabrication of the bristles but the fabrication of such bristles is considered to be well known to those skilled in the art for similar purposes. Backing plate 108 includes a back surface 110. Back surface 110 may be formed as an integral part of bristle holder 105 or it may be a separate component. Bristle holder 105 and backing plate 108 are positioned to urge the bristles into contact with radial surface 104. The bristles are urged into contact with surface 104 by at least one spring 112 positioned between the downstream end 117 of the cavity and the back surface 110. This spring is desirably a bow spring which extends circumferentially around at least a major portion of inner barrel member 18. Different kinds of springs could be used but bow springs are preferred for this application. The bristles are urged toward radial surface 104 at a slight pressure.

Figure 6:
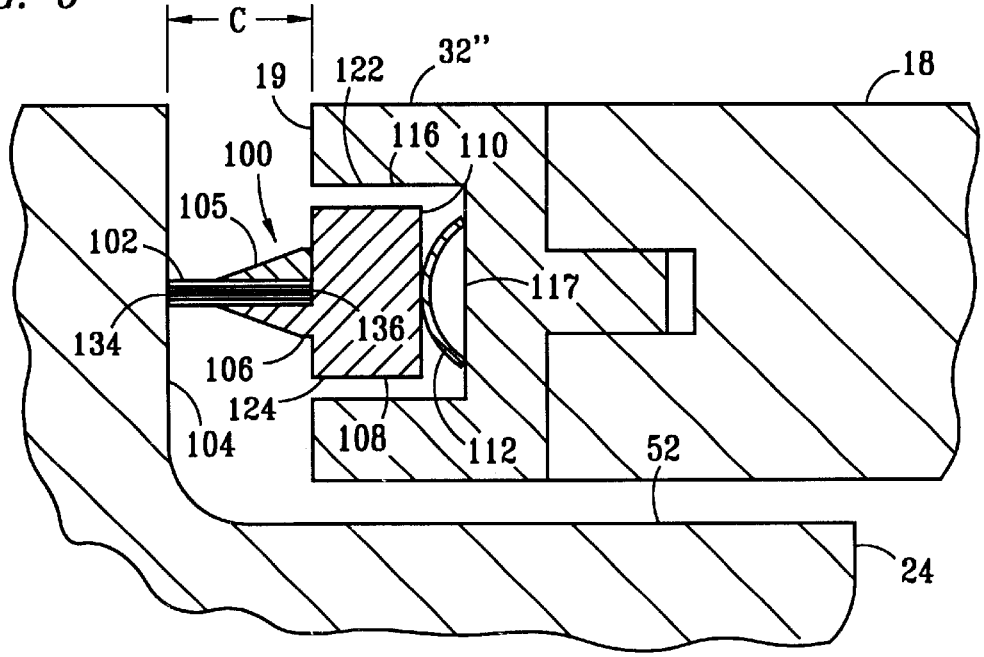
FIG. 6 shows an alternate embodiment of the axially loaded floating seal of FIG. 5.

An alternate embodiment of the axially loaded brush seal of FIG. 5 is shown in FIG. 6. In this FIG. an insert 32" is positioned in end 19 of inner barrel 18 by interlocking connections. The back plate is shown as a thicker member which is free to move toward radial surface 104 without restraint. In both the embodiments shown in FIG. 5 and FIG. 6 similar pressure is applied to the bristles. In both embodiments the outside of the bristle holder 105 and backing 108 are designed to ensure that the bristles remain axially directed toward surface 104 relative to the axis of inner barrel 18. In the embodiment shown in FIG. 6 a similar spring is used although various types of springs could be used. For instance leaf springs of stainless steel or other suitable material could be used in lieu of the bow springs. Other springs could be used as known to those skilled in the art although as indicated the bow springs are preferred.

Figure 7:
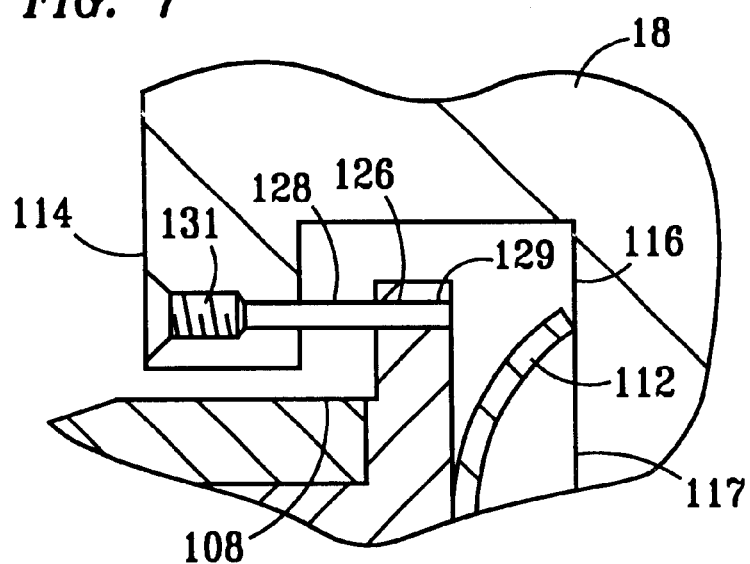
FIG. 7 is a cross-sectional view of a portion of the axially loaded floating seal of FIG. 5 showing engagement pins to prevent rotation of the floating seal relative to an inner barrel.

In FIG. 7 a detailed section of the drawing in FIG. 5 is shown. In this detail a pin 126 is shown positioned to prevent rotary movement of the axial loaded brush seal 100 relative to inner barrel 18. The pin 126 comprises a smooth section 128 which is positioned slideably in an opening 129 in backing 108. Pin 126 is maintained in position by threads 131 which engage a threaded opening in lip 114. Backing plate 108 is then free to move axially to urge bristles 102 into engagement with surface 104.

Figure 8:
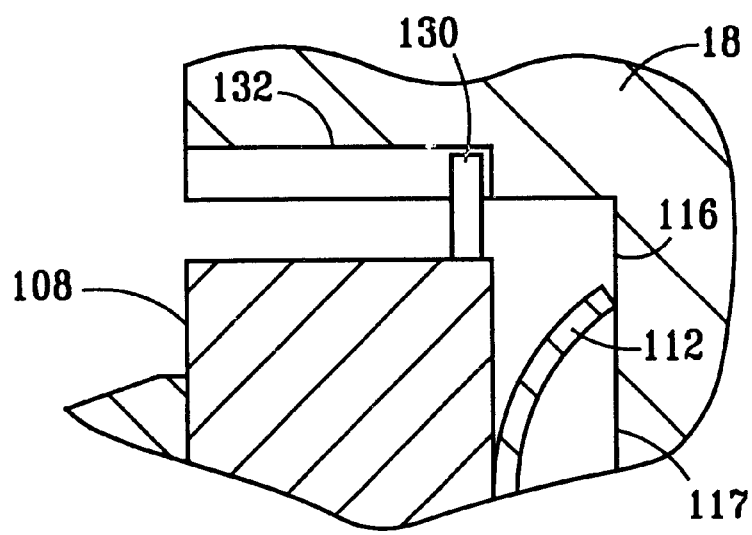
FIG. 8 is a partial cross-section view of a portion of the floating seal of FIG. 6 showing engagement pins to prevent rotation of the floating seal relative to an inner barrel.

In the embodiment shown in FIG. 8 the backing plate as shown in FIG. 6 is provided with a pin 130 to permit sliding motion. Pin 130 extends into a slot 132 in a side of cavity 116 so that backing plate 108 can move toward surface 104 but so that it cannot rotate relative to inner barrel 18.

In both instances a plurality of pins can be used as well known to those skilled in the art. In both instances the backing plate and accordingly the axially loaded brush seal can be installed on the end of inner barrel member 18 in sections. These sections are retained in position by pins as shown. A plurality of pins can be used in each instance as necessary to prevent rotation of the brush seal relative to the inner barrel.

When the inner barrel is formed as hemispherical or other sectioned portions the seal as shown in FIG. 5 may be inserted in a slot by sliding both the spring and the seal into the slot while the inner barrel is disassembled. In the instance shown in FIG. 5 the seal and back plate may be installed at any convenient time. Desirably the tension on the brushes is maintained by spring 112 as the brush bristles are moved into engagement with 104 as the components are assembled.

By the use of the axially loaded seal of the present invention variations in seal pressure relative to the rotor surfaces can be minimized. In other words the expansion and contraction of inner barrel 18 and rotor 24 are different in many instances and as a result severe differences in clearance can result between end 19 of inner barrel 18 and the land surfaces 52 of rotor 24. By the use of the present invention this differential is avoided since any expansion axially by the inner barrel is readily compensated by spring 112. Since the present seal also forms a very tight seal it is necessary as disclosed above to provide an air flow into chamber 28 defined by inner barrel 18 to provide suitable cooling. A labyrinth as previously used can be used with the present invention. A labyrinth seal is shown schematically in FIG. 5 by the numeral 22 referring to triangular sections appended to inner barrel 18 in the space where the labyrinth has previously been used. The use of labyrinths is well known to those skilled in the art and need not be discussed further.

By the present invention an improved floating brush seal has been provided which is less susceptible to thermal expansion and contraction differences in inner barrel 18 and rotor 24. Further, the floating brush seal of the present invention contacts a surface which is not critical tolerance wise with respect to the operation of the machine and the floating brush seal of the present invention requires less modification of the end of inner barrel member 18 than previously proposed seals. Accordingly, it is respectfully submitted that a much superior seal has been provided by the present invention.

A much improved seal and method for controlling airflow in a stationary gas turbine engine has been provided.

Having thus described the invention by reference to certain of its preferred embodiments, it is respectfully submitted that the embodiments described above are illustrative rather than limiting in nature and that many variations and modifications are possible within the scope of the present invention. Many such variations and modifications may be considered obvious and desirable by those skilled in the art based upon the foregoing description of preferred embodiments.

I claim:

1. A stationary gas turbine engine for a power plant having an axially loaded floating brush seal and comprising:
　(a) a multistage axial compressor, the compressor having a rotor, the rotor having a radial surface downstream of at least a major portion of the compressor;
　(b) a turbine shaft-coupled to the rotor;
　(c) a stationary inner barrel member having an end and a cavity positioned in the end of the inner barrel member, the cavity having an inner surface, the inner barrel being downstream of at least a major portion of the compressor, air flowing from the compressor passing outside of the inner barrel member, a chamber within the inner barrel member forming a passage for cooling air from the compressor, the cooling air flowing from the chamber and being mixed with combustion gases upstream of the turbine;

(d) a said axially loaded floating brush seal for controlling air passage into the chamber from the compressor, the axially loaded floating brush seal comprising:
  (i) a bristle holder axially positioned relative to the inner barrel;
  (ii) a multiplicity of bristle members extending axially from the bristle holder toward the radial surface of the rotor, downstream extremities of the bristle members being rigidly retained relative to the bristle holder;
  (iii) a back plate connected to the downstream end of the bristle holder and having its downstream side adapted to engage a spring; and,
  (iv) at least one of said spring mounted between the back plate and the inner surface of the cavity to urge the bristle members into contact with the radial surface of the rotor.

2. The engine of claim 1 wherein the cavity contains at least one retainer lip configured to retain the back plate in the cavity.

3. The engine of claim 1 wherein the cavity and back plate are configured to permit movement of the brush seal axially relative to the outside diameter of the rotor and axially relative to an axis of the rotor.

4. The engine of claim 3 wherein the spring is a bow spring.

5. The engine of claim 1 wherein a plurality of pins are positioned to engage the brush seal and slidably engage the brush seal to prevent rotation of the brush seal relative to the inner barrel.

6. The engine of claim 1 wherein at least one passageway is provided through a wall of the inner barrel member and in fluid communication with a compressed air outlet stream from the compressor.

7. The engine of claim 6 wherein flow through the passageway is controlled by an airflow-regulating device.

8. The engine of claim 7 wherein the airflow-regulating device is a jet, a plug or a valve.

9. The engine of claim 1, further comprising means for selectively providing a flow of cooling air into the chamber, comprising:
  (a) a passage extending through one wall of the inner barrel;
  (b) means for connecting the passage to an auxiliary source of pressurized air external of the inner barrel and at a pressure greater than the pressure in the chamber, whereby the pressurized air flows into the chamber; and
  (c) a flow control device for controlling the flow of pressurized air into the chamber.

10. The engine of claim 1, wherein the brush seal is segmented for facilitating assembly in the cavity.

11. A stationary gas turbine comprising:
  (a) a first rotary compressor component having a rotor having a radial surface;
  (b) a non-rotary second component having an end extending over and around at least a portion of the rotor with an end near the radial surface and including a cavity;
  (c) a passageway between the end of the second component and the rotor; and,
  (d) an axially loaded floating brush seal positioned on the end of the second component to resiliently engage the radial surface, the floating brush seal comprising:
    (i) a bristle holder axially positioned relative to the second component;
    (ii) a multiplicity of bristle members extending axially at their first ends from the bristle holder toward the radial surface of the rotor, second ends of the bristle members being rigidly retained relative to the bristle holder;
    (iii) a back plate connected to an end of the bristle holder; and,
    (iv) at least one spring mounted between the back plate and an inner surface of the cavity to urge the bristle members into contact with the radial surface of the rotor.

12. The engine of claim 11 wherein the cavity contains a retainer lip configured to retain the back plate in the cavity.

13. The engine of claim 11 wherein the enclosure is configured to permit movement of the brush seal axially relative to the outside diameter of the rotor and axially relative to an axis of the rotor.

14. The engine of claim 11 wherein a plurality of pins are positioned to engage the back plate and axially, relative to an axis of the rotor, slidably engage the back plate to prevent rotation of the back plate relative to the outer diameter of the rotor.

15. The engine of claim 11 wherein at least one passageway is provided through a wall of the inner barrel member and in fluid communication with a compressed air outlet stream from the compressor.

16. The engine of claim 15 wherein flow through the passageway is controlled by an airflow-regulating device.

17. The engine of claim 16 wherein the airflow-regulating device is a jet, a plug or a valve.

18. The engine of claim 11, further comprising means for selectively providing a flow of cooling air into the chamber, comprising:
  (a) a passage extending through one wall of the inner barrel;
  (b) means for connecting the passage to an auxiliary source of pressurized air external of the inner barrel and at a pressure greater than the pressure in the chamber, whereby the pressurized air flows into the chamber; and
  (c) a flow control device for controlling a flow of pressurized air into the chamber.

19. The engine of claim 11, wherein the brush seal is segmented for facilitating assembly in the cavity.

20. A method for controlling cooling air flow into a chamber in a stationary inner barrel member in a turbine power plant having a multi-stage axial compressor, a turbine shaft-coupled to a rotor of the compressor, the rotor having a radial surface, positioned circumferentially relative to the shaft and near an end of the stationary inner barrel member, the method consisting essentially of:
  (a) positioning a brush seal comprising:
    (i) a bristle holder axially positioned relative to the inner barrel;
    (ii) a multiplicity of bristle members extending axially at their first ends from the bristle holder toward the radial surface of the rotor, second ends of the bristle members being rigidly retained relative to the bristle holder;
    (iii) a back plate connected to an end of the bristle holder; and,
    (iv) at least one spring mounted between the back plate and an inner surface of a cavity in the end of the inner barrel to urge the bristle members into contact with the radial surface of the rotor; and,
  (b) providing substantially all of the cooling airflow required in the chamber via at least one flow-controlled passageway in fluid communication with at least one of a compressor outlet and an auxiliary air source and the chamber.

* * * * *